United States Patent
Benisty (10) Patent No.: US 12,417,184 B2
(45) Date of Patent: Sep. 16, 2025

(54) SPECULATIVE ADDRESS TRANSLATION SERVICE REQUESTS

(71) Applicant: SANDISK TECHNOLOGIES, INC., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/502,538

(22) Filed: Nov. 6, 2023

(65) Prior Publication Data

US 2025/0147898 A1 May 8, 2025

(51) Int. Cl.
G06F 12/1027 (2016.01)

(52) U.S. Cl.
CPC ............... *G06F 12/1027* (2013.01)

(58) Field of Classification Search
CPC .................................................. G06F 12/1027
See application file for complete search history.

(56) References Cited

U.S. PATENT DOCUMENTS

| | | | |
|---|---|---|---|
| 8,024,547 B2 | 9/2011 | Lee et al. | |
| 11,199,992 B2 | 12/2021 | Richter et al. | |
| 11,625,335 B2 | 4/2023 | Borikar et al. | |
| 2016/0350225 A1* | 12/2016 | Podaima | G06F 12/10 |
| 2020/0034298 A1* | 1/2020 | Benisty | G06F 12/0873 |
| 2021/0149805 A1* | 5/2021 | Pinho | G06F 12/0862 |
| 2021/0149815 A1 | 5/2021 | Gayen et al. | |
| 2022/0214975 A1* | 7/2022 | Bataineh | H04L 47/626 |
| 2022/0261355 A1 | 8/2022 | Speier et al. | |
| 2023/0153245 A1* | 5/2023 | Jo | G06F 12/0868 |
| | | | 711/103 |
| 2023/0401160 A1* | 12/2023 | Huggahalli | G06F 12/0862 |

\* cited by examiner

*Primary Examiner* — Jason W Blust
(74) *Attorney, Agent, or Firm* — Patterson + Sheridan, LLP (57) ABSTRACT

Reducing extra traffic on the PCIe bus by initiating speculative address translation requests and aggregating them with normal address translation request can lead to significantly improved data retrieval performance. This can be achieved by issuing speculative address translation requests based on history or structure of host buffer pointers previously issued by each tenant. If the device controller determines that there is a high-hit rate probability, the controller will coalesce the speculative requests with the normal address translation request. The coalescing may be accomplished by dynamically changing the length field in the address translation request. The controller may also collect statistics of the speculative address translation requests per tenant. If the controller determines that the performance gain for a specific tenant's workload becomes minimal, the speculative request feature is disabled.

19 Claims, 8 Drawing Sheets

| Type 402 | Traffic Class 404 | Length 406 |
|---|---|---|
| Requester ID 408 | | Tag 410 |
| Untranslated Address 412 | | |

| Host Pointer Pattern 600 | |
|---|---|
| Pointer 1 | 44129000 |
| Pointer 2 | 4412A000 |
| Pointer 3 | 4412B000 |
| ... | |
| Pointer N | |

FIG. 6

| Host Pointer Pattern 700 | |
|---|---|
| Pointer 1 | 52110000 |
| Pointer 2 | 5210F000 |
| Pointer 3 | 5210E000 |
| ... | |
| Pointer N | |

SPECULATIVE ADDRESS TRANSLATION SERVICE REQUESTS

BACKGROUND OF THE DISCLOSURE

Field of the Disclosure

Embodiments described herein generally relate to an improved process to reduce extra traffic on a PCIe bus.

DESCRIPTION OF THE RELATED ART

A solid state drive (SSD) may be shared across multiple tenants (e.g., virtual machines or VMs) without any hypervisor layer between the SSD and the VMs. In such a multi-tenancy system where the SSD is directly accessed by guest VMs, the device receives only the Peripheral Component Interface Express (PCIe) addresses, and the device needs to perform address translations. To enable the host operating system (OS) to execute memory page movements, the SSD needs to implement an Address Translation Service (ATS) and a Page Request Interface (PRI) functionality in any PCIe device that is directly accessed by guest VMs. Moving memory pages implies the device will receive PCIe addresses that need to be translated. Further, the host system includes a Translation Agent (TA) to service memory translation requests. When the ATS-enabled SSD device accesses the system memory, it is configured to cache translated addresses in an internal Address Translation Cache (ATC). The ATS-enabled SSD device implements and maintains its own ATC to minimize performance dependencies on the TA and alleviate TA resource pressure.

Currently, most ATS requests required in non-volatile memory express (NVMe) applications involve host pointer fetching using either physical region page (PRP) entries or scatter gather lists (SGL). However, supporting the ATS request feature adds extra complexity and decreases performance. Additionally, the ATS adds extra traffic on the PCIe bus due to extra address translation related packets. Moreover, the ATS requests are issued only when the translated addresses are required by the data-transfer. The device controller does not issue any speculative address translations based on the history or structures of host buffer pointers that were previously issued by each tenant.

There is a need in the art for an improved process to reduce extra traffic on a PCIe bus.

SUMMARY OF THE DISCLOSURE

Reducing extra traffic on the PCIe bus by initiating speculative address translation requests and aggregating them with normal address translation request can lead to significantly improved data retrieval performance. This can be achieved by issuing speculative address translation requests based on history or structure of host buffer pointers previously issued by each tenant. If the device controller determines that there is a high-hit rate probability, the controller will coalesce the speculative requests with the normal address translation request. The coalescing may be accomplished by dynamically changing the length field in the address translation request. The controller may also collect statistics of the speculative address translation requests per tenant. If the controller determines that the performance gain for a specific tenant's workload becomes minimal, the speculative request feature is disabled.

In one embodiment, a data storage device comprises: a memory device; and a controller coupled to the memory device, wherein the controller is configured to: determine a need to send an address translation request packet; send a speculative address translation request packet to a host device, wherein the speculative address translation request packet comprises at least one of: one or more speculative requests; and one or more non-speculative requests; receive the one or more translated speculative addresses from host device; and cache the one or more translated speculative addresses, wherein the data storage device is configured to be a part of a multi-tenancy system.

In another embodiment, a data storage device comprises: a memory device; and a controller coupled to the memory device, wherein the controller is configured to: collect at least one statistic of an address translation request packet; evaluate the collected statistic of the address translation request packet; and determine whether to issue a speculative address translation request.

In another embodiment, a data storage device comprises: means to store data; and a controller coupled to the means to store data, wherein the controller is configured to: determine a need to send an address translation request packet; determine a need to expand the address translation request packet to cover additional untranslated contiguous addresses; evaluate a benefit of speculative fetching for address translation; add one or more speculative requests to the address translation request packet; determine a value of a length field; and cache one or more speculative translated addresses.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Reducing extra traffic on the PCIe bus by initiating speculative address translation requests and aggregating them with normal address translation request can lead to significantly improved data retrieval performance. This can be achieved by issuing speculative address translation requests based on history or structure of host buffer pointers previously issued by each tenant. If the device controller determines that there is a high-hit rate probability, the controller will coalesce the speculative requests with the normal address translation request. The coalescing may be accomplished by dynamically changing the length field in the address translation request. The controller may also collect statistics of the speculative address translation requests per tenant. If the controller determines that the performance gain for a specific tenant's workload becomes minimal, the speculative request feature is disabled.

Figure 1:
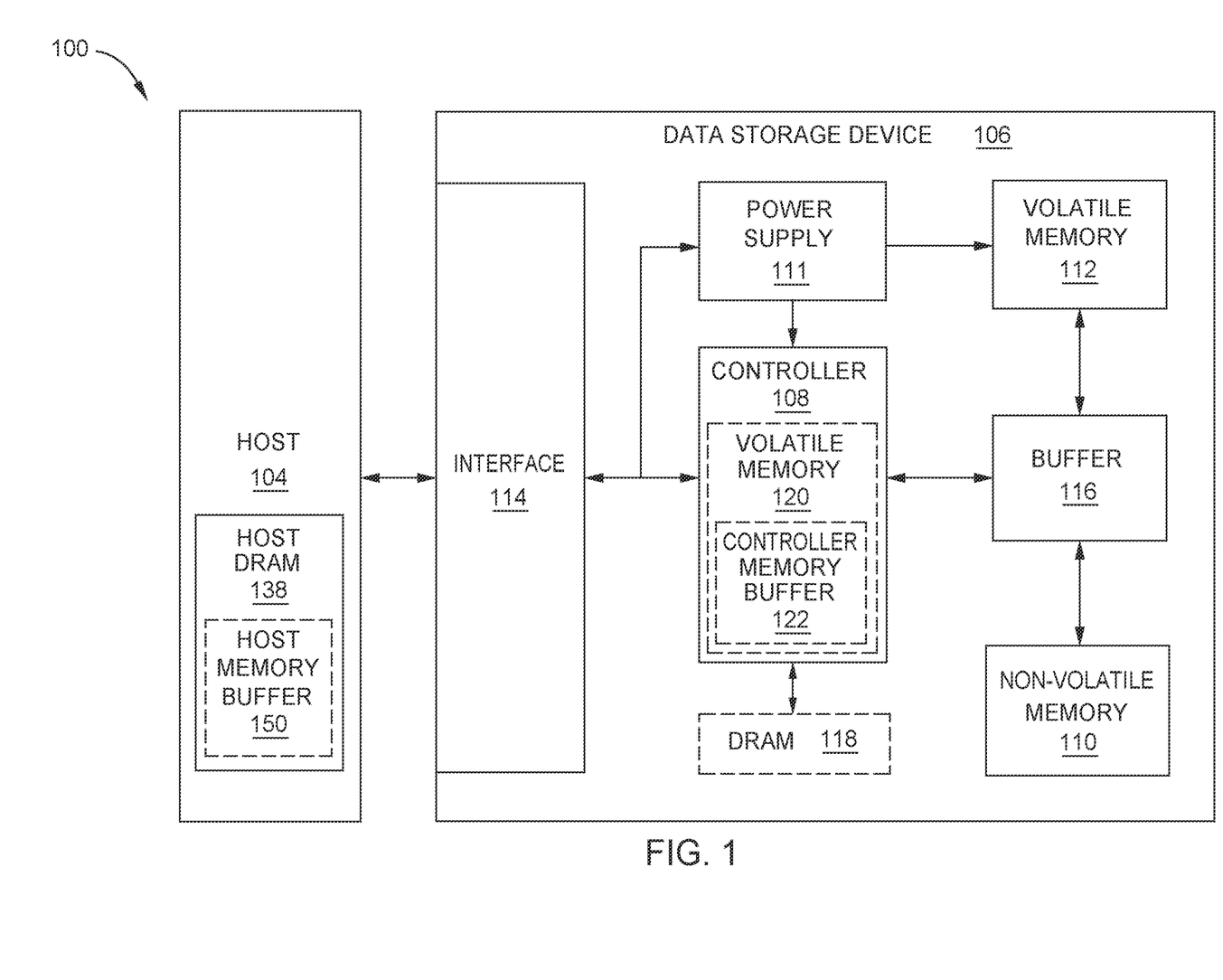
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVMe) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVMe 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVMe 110 may include a plurality of memory devices or memory units. NVMe 110 may be configured to store and/or retrieve data. For instance, a memory unit of NVMe 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVMe 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVMe 110 may comprise a plurality of flash memory devices or memory units. NVMe Flash memory devices may include NAND or NOR-based flash memory devices and may store data based on a charge contained in a floating gate of a transistor for each flash memory cell. In NVMe flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVMe cells. Rows of NVMe cells may be electrically connected using a word line to define a page of a plurality of pages. Respective cells in each of the plurality of pages may be electrically connected to respective bit lines. Furthermore, NVMe flash memory devices may be 2D or 3D devices and may be single level cell (SLC), multi-level cell (MLC), triple level cell (TLC), or quad level cell (QLC). The controller 108 may write data to and read data from NVMe flash memory devices at the page level and erase data from NVMe flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVMe 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVMe 110. In some embodiments, when the data storage device 106 receives a write command from the host device 104, the controller 108 may initiate a data storage command to store data to the NVMe 110 and monitor the progress of the data storage command. Controller 108 may determine at least one operational characteristic of the storage system 100 and store at least one operational characteristic in the NVMe 110. In some embodiments, when the data storage device 106 receives a write command from the host device 104, the controller 108 temporarily stores the data associated with the write command in the internal memory or write buffer 116 before sending the data to the NVMe 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
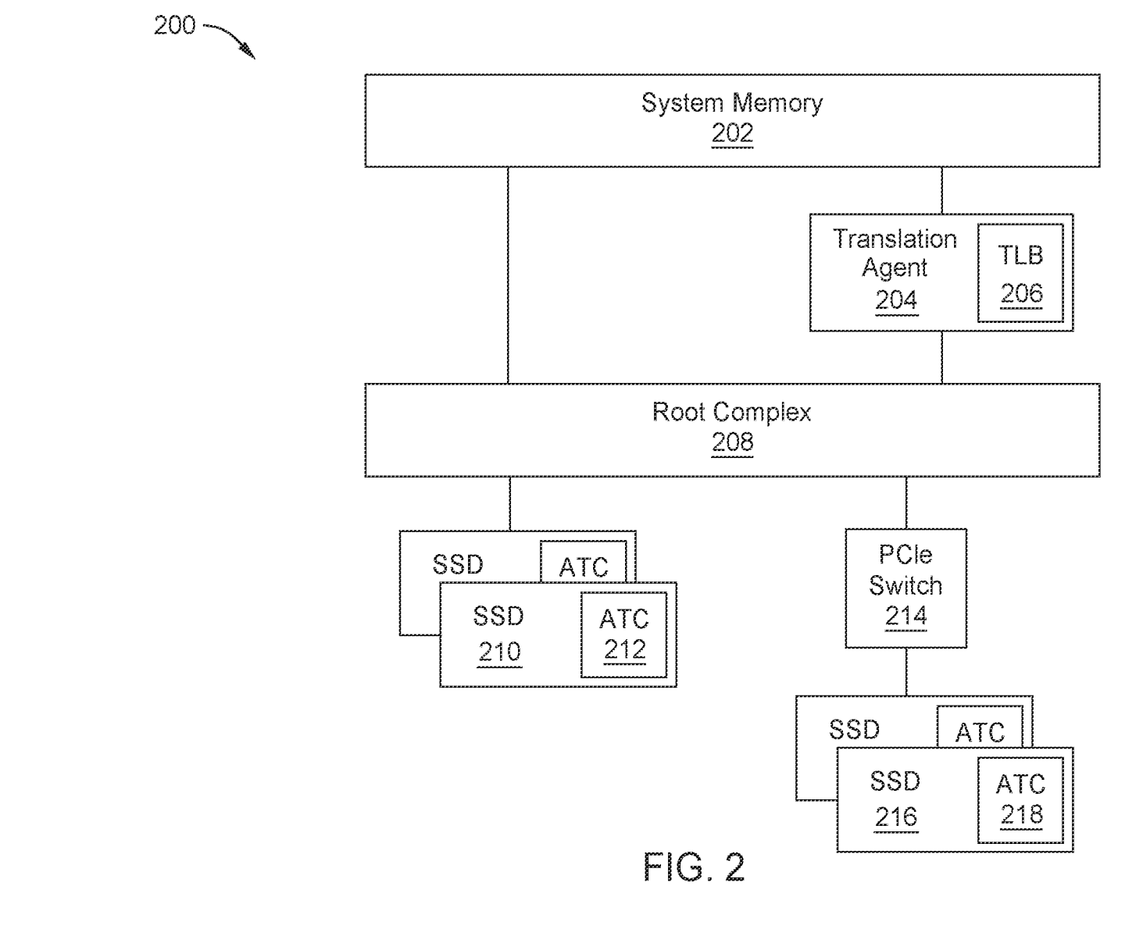
FIG. 2 is a schematic diagram illustrating a multi-tenancy system supporting ATS functionality, according to certain embodiments.

FIG. 2 is a schematic diagram illustrating a multi-tenancy system 200 supporting ATS functionality, according to certain embodiments. A translation agent (TA) services memory translation requests within the TA. Within the TA, the ATC is referred to as a translation look-aside buffer (TLB) in the TA. When the ATS enabled SSD device accesses system memory, the SSD shall cache translated addresses in an internal ATC. The ATC is different from the TLB translation cache used by the host. When the ATS enabled SSD device shall implement and maintain a designated ATC to minimize performance dependencies on the TA and alleviate TA resource pressure.

In one embodiment, all the addresses provided over PCIe are virtual addresses that are untranslated address. Translations must be done before using the virtual addresses. The device receives the commands and then takes the PRP and all addresses provided by the host. The SSD device passes the specific address request to the TA. The TA is a part of the host. The TA will receive the request and the virtual addresses from the SSD device to get translated. As a response, the SSD device will receive back the translated addresses. The device now will be able to issue memory read and memory write requests using the translated addresses. The translated addresses will then be forwarded to the system memory.

The PCIe standard defines the ATC. The ATC is a cache buffer in the SSD. Using the cache buffer, the SDD is allowed to cache some address translation in the ATC. Whenever an SSD gets a command and then gets the PRP first, the SSD will do some lookup over the internal ATC. Only if the SSD finds a match the SSD will use the translated address stored in the ATC. Otherwise the SSD will interact with the TLB.

Examples of PCIe addresses to be translated include: caching of submission queue (SQ) and completion queue (CQ) address ranges; SQ entry decoding including standard decoding of the data pointer for read or write that submit translation requests immediately, PRPs and SGLs that decode the data pointers and follow linked lists and upper bound of translations per large commands equal a rate match PRI translations with Gen5 bandwidth (BW) maximums, and DIX translation requests for metadata pointers and associated linked lists of addresses.

As will be discussed herein, the disclosure presents the idea of issuing speculative address translation requests based on the history and structure of host buffer pointers (PRP or SGL) issued previously by each tenant. If the data storage device controller determines that there may be a good probability of a high hit rate, the controller coalesces the speculative requests with the normal address translation requests. The coalescing is done by changing dynamically the length field in the address translation request packet.

In operation, the controller collects statistics of the speculative address translation requests per tenant. If the controller sees that the gain for a specific tenant's workload becomes minimal, the speculative request feature is disabled for the specific case. The advantage of the process is related to efficiency on a PCIe interface while aggregating ATS requests and reducing the extra traffic. If the hit rate is medium high, there will be a significant gain in performance.

Figure 3:
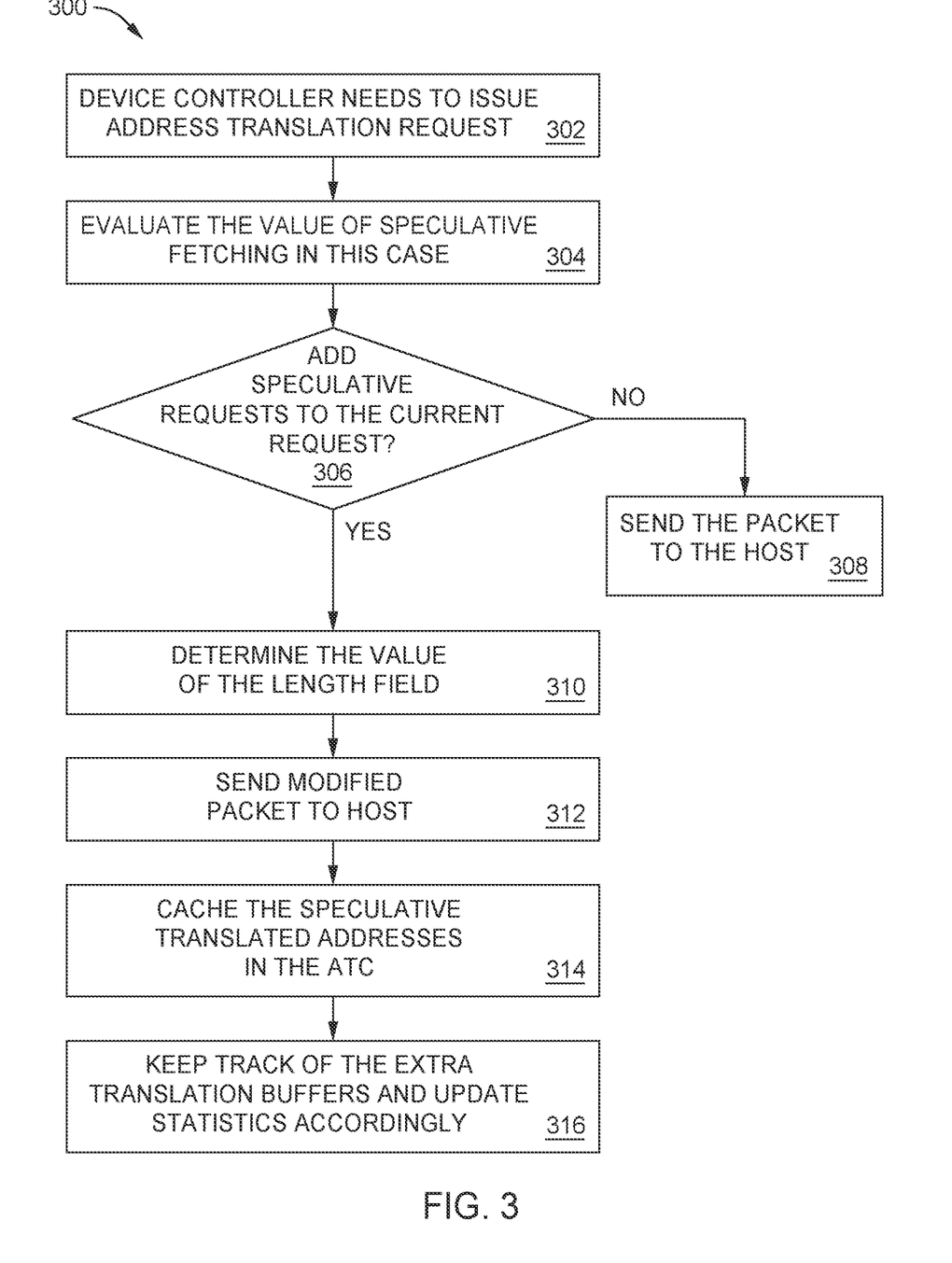
FIG. 3 is a flowchart illustrating an address translation process, according to one embodiment.

FIG. 3 is a flowchart illustrating a speculative ATS request process 300, according to one embodiment. The speculative ATS request process 300 may be performed by a device controller of a storage device, such as controller 108 of FIG. 1. The device controller may use speculative fetching when the device controller determines that use of speculative fetching would result in a benefit to performance. For example, a benefit to performance may be a reduction of extra traffic on the PCIe bus. The benefit of using speculative fetching may be determined after evaluating several statistics. For example, a host tenant ID, the method used by the host for describing the buffer pointers (PRP or SGL), the workload type of the host device, the structure of the buffer pointers (PRPs and SGLs), and the hit-rate of the speculative fetched translated addresses. When the device controller matches a subsequent ATS request with a speculative fetched translated address stored in the ATC, it is considered a "hit."

A device controller utilizes speculative fetching by adding translation requests to the normal ATS request (i.e., the current non-speculative ATS request). In other words, a device controller will use speculative fetching by requesting more addresses than are needed for the current non-speculative ATS request. Although the additional requests are not needed to process the current non-speculative ATS request, the device controller will speculate to which addresses may be requested later on by the tenant, and preemptively request such addresses to be translated in the same packet with the addresses needed for the current non-speculative ATS request sent to the host. If a device controller determines that the hit rate is above a threshold, the device controller coalesces the speculative requests with the normal ATS request. The coalescing is done by dynamically changing the length field in the ATS request packet. Conversely, if the device controller determines that the benefit of using speculative fetching for a specific tenant's workload falls below a threshold, speculative fetching may be disabled for that specific ATS request.

The speculative ATS request process 300 begins at 302, where the device controller receives an address translation service (ATS) request. After the device controller receives an ATS request, at 304, the device controller evaluates the benefit of using speculative fetching for the ATS request. At 306, if speculative fetching is beneficial, then the device controller determines whether to add speculative requests to the normal ATS request. If, the device controller determines that speculative fetching should not be added to the normal ATS request (i.e., there is no benefit to adding speculative requests), at 308, the device controller sends the packet to the host without adding speculative requests.

If, based on the benefit of speculative fetching, the device controller determines that speculative requests should be added to the normal request, at block 310, the device controller then determines the value and range of the length field. The value of the length field indicates the amount of translations that may be returned in response to an ATS request. Thus, speculative translation requests can be added to the normal ATS request by dynamically changing the length field in the ATS packet.

At 312, the device controller sends the modified packet, which includes the speculative requests aggregated with the normal ATS request, to the TA in the host device for translation. At 314, once the device controller receives the translated addresses from the host device, the device controller caches the speculative translated addresses in the ATC. At 316, the device controller will keep track of the cached speculative translated addresses and update statistics of the speculative translated addresses of each tenant accordingly.

As a result, issuing speculative address translation requests alongside normal ATS requests increases performance by reducing the extra traffic on the PCIe bus. During the initial cycle of the speculative ATS request process 300, the ATC has not yet cached any speculative translated addresses. However, in subsequent cycles of the speculative ATS request process 300, speculative translated addresses may be cached in the ATC.

Figure 4:
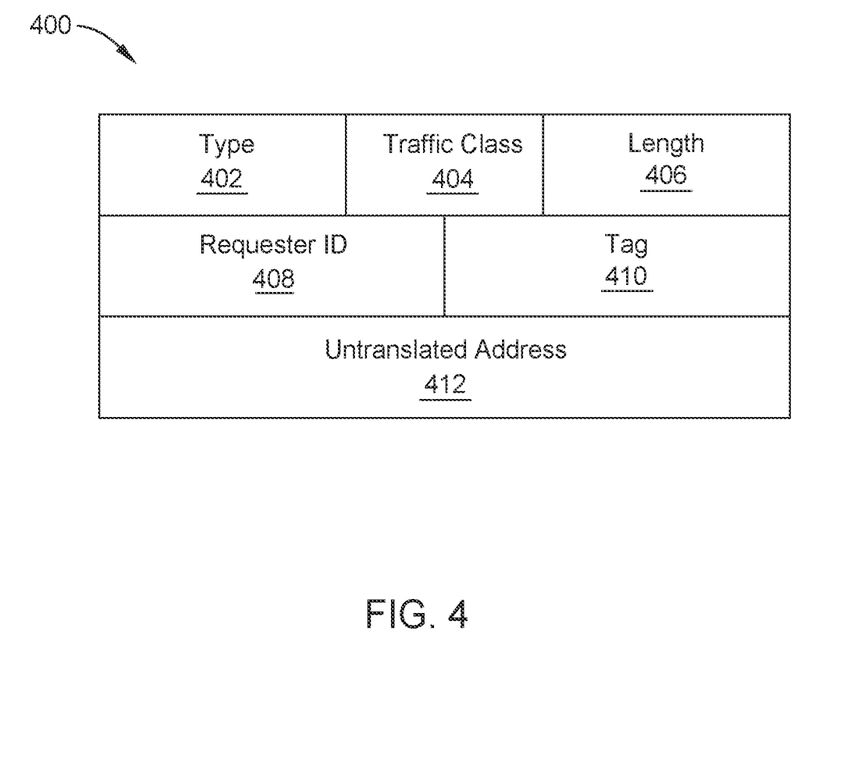
FIG. 4 is schematic illustration of a translation request header, according to one embodiment.

FIG. 4 is schematic illustration of a translation request header 400, according to a certain embodiment. The translation request header 400 comprises a type 402, a traffic class 404, a length field 406, a requester ID 408, a tag 410, and an untranslated address 412. The format of an ATS request is similar to a memory read. However, the length field 406 of an ATS request differentiates an ATS request from a memory read. The device controller determines the value of the length field based on statistics collected from individual tenants by the device controller. The length field 406 indicates how many translation may be returned in response to the ATS request. If the device controller detects that there is a benefit to increasing the value of the length field 406, which means asking for more translated addresses than what is needed by the normal ATS request, the value of the length will dynamically change with each request.

Figure 5:
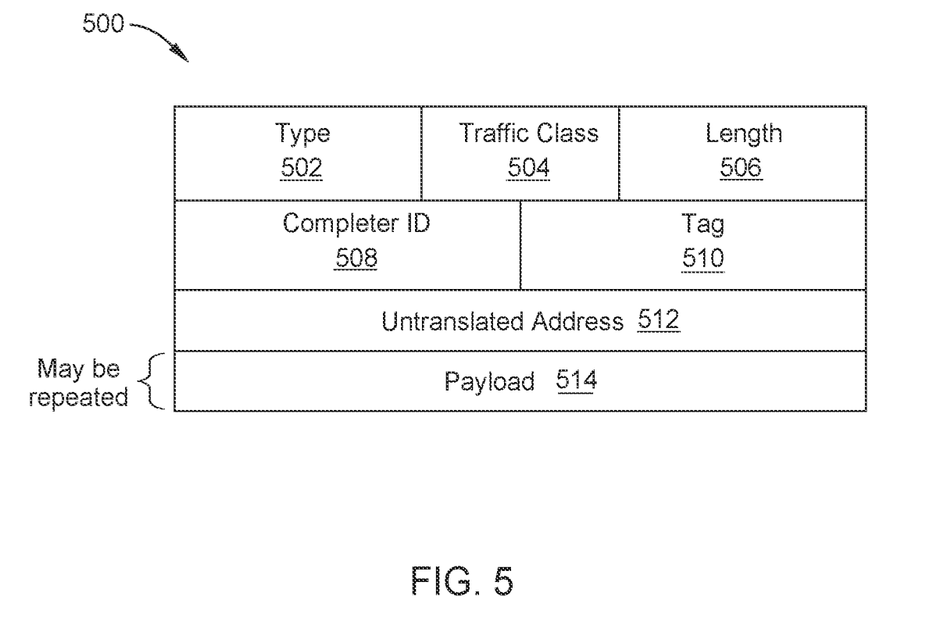
FIG. 5 is a schematic illustration of a translation completion packet, according to another embodiment.

FIG. 5 is a schematic illustration of a translation completion packet 500, according to a certain embodiment. The translation completion packet 500 comprises a type 502, a traffic class 504, a length field 506, a completer ID 508, a tag 510, an untranslated address 512, and a payload 514. The translation completion packet is received by the device controller and holds the translated addresses. In some embodiments, the device controller will request an address translation with the length of 8 KB and the host device responds with two different translated addresses since the translation may not be contiguous.

Figure 6:
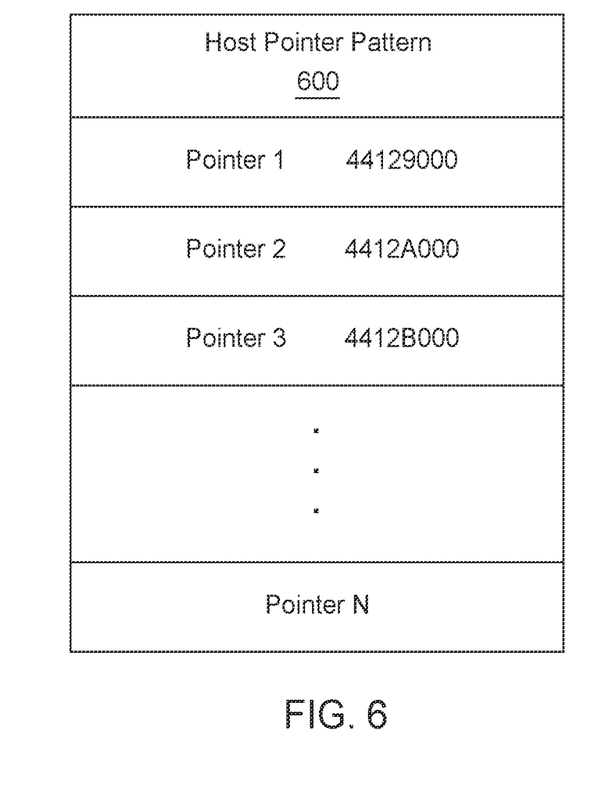
FIG. 6 is a schematic illustration of an ascending pointer pattern, according to one embodiment.

FIG. 6 is a schematic illustration of an exemplary host pointer pattern 600 with ascending physical location addresses, according to one embodiment. Host pointer pattern 600 demonstrates the pointer pattern of several hosts working with an NVMe controller, in this example pointers 1-3 and pointer N.

Many kinds of patterns, or pattern types, including the history and structure of host pointers may be detected and used in determining the value of speculative fetching or the value of the length field. Some host pointers may create a contiguous buffer, such as when host pointers have ascending physical location addresses across pointers. For example, if three host pointers are "44129000", "4412A000" and "4412B000", a pattern of ascending physical location addresses can be detected. This ascending pattern indicates a contiguous buffer starting with the address "44129000." By detecting ascending patterns, the device controller may preemptively request translated addresses needed in the future.

Figure 7:
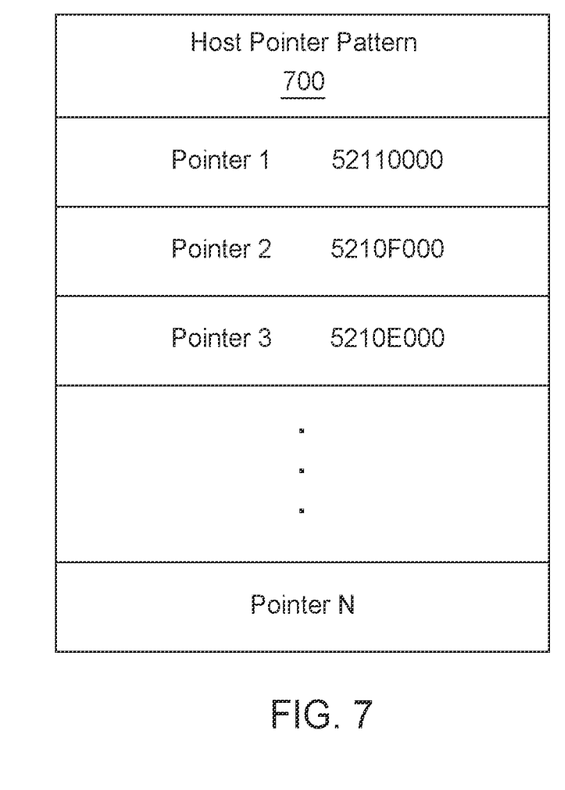
FIG. 7 is a schematic illustration of a descending pointer pattern, according to another embodiment.

FIG. 7 is a schematic illustration of an exemplary host pointer pattern 700 with descending physical location addresses, according to another embodiment. Host pointer pattern 700 demonstrates the pointer pattern of several hosts working with an NVMe controller, in this example pointers 1-3 and pointer N.

Many kinds of patterns, or pattern types, including the history and structure of host pointers may be detected and used in determining the value of speculative fetching or the value of the length field. Some host pointers may create a contiguous buffer, such as when host pointers have descending physical location addresses across pointers. For example, in a descending physical location address pattern, three host pointers are "52110000", "5210F000", and "5210E000", a pattern of descending physical location addresses can be detected. This descending pattern indicates a contiguous buffer starting with the address "52110000." By detecting descending patterns, the device controller may preemptively request translated addresses needed in the future.

Figure 8:
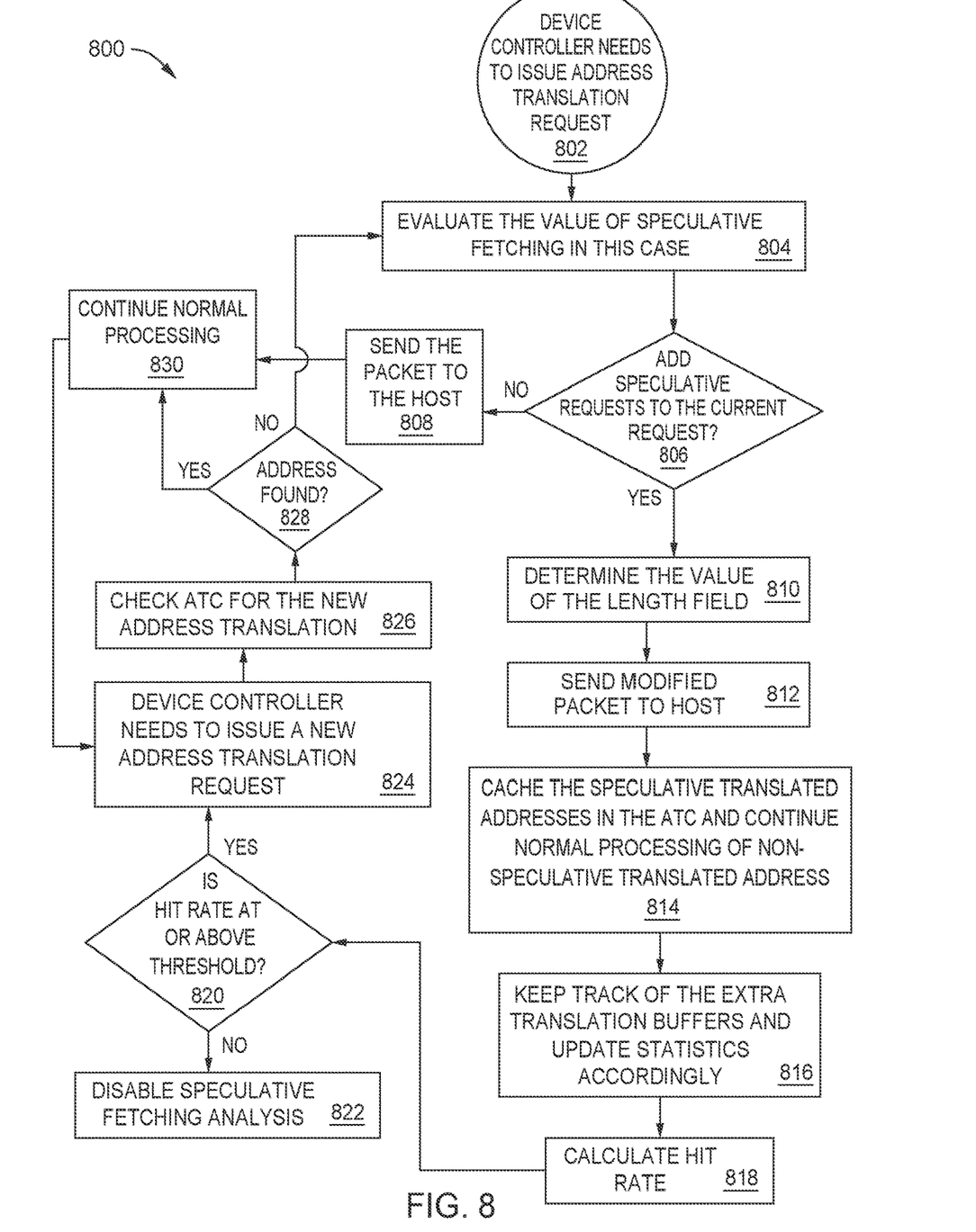
FIG. 8 is a flowchart illustrating an address translation process, according to another embodiment.

FIG. 8 is a flowchart illustrating a speculative ATS request process according to another embodiment. The speculative ATS request process 800 may be performed by a device controller of a storage device, such as controller 108 of FIG. 1. The speculative ATS request process 800 begins at 802, where the device controller receives an address translation service (ATS) request. After the device controller receives an ATS request, at 804, the device controller then evaluates the benefit of using speculative fetching for the ATS request. At 806, based on the benefit of speculative fetching for the ATS request the device controller then determines whether to add speculative requests to the normal ATS request. If, the device controller determines that speculative fetching should not be added to the ATS request (i.e., there is no benefit to using speculative fetching), at 808, the device controller sends the packet to the host without speculative requests. At 830, the device controller processes the request as normal and waits until the device controller needs to issue another ATS request.

If, based on the value of speculative fetching, the device controller determines that speculative requests should be added to the normal ATS request, at block 810, the device controller then determines the value of the length field. At 812, the device controller sends the modified packet, which includes the speculative requests aggregated with the normal ATS request, to the TA in the host device for translation. At 814, once the device controller receives the translated addresses from the host device, the device controller caches the speculative translated addresses in the ATC and processes the normal non-speculative translated addresses. At 816, the device controller will keep track of the cached speculative translated addresses and update statistics accordingly.

At 818, the device controller calculates the hit rate of the speculative translated addresses. The hit rate of the speculative translated addresses is the accuracy rate of the speculative fetching feature. In other words, when the device controller matches a subsequent ATS request with a speculative fetched translated address stored in the ATC, it is considered a "hit."

At 820, the device controller determines if the hit rate is at or above a threshold. At 822, if the hit rate is not at or above the threshold, the device controller will disable speculative fetching analysis. If the hit rate is at or above threshold, at 824, the device controller will wait until the device controller needs to issue a new ATS request. When there is a need to issue a new ATS request, at 826, the device controller will access the ATC to check for the corresponding translated address. At 828, if the corresponding translated address is found (i.e., a "hit"), the device controller will continue normal processing of the translated address. After the device controller processes the translated address, it will wait until there is need to issue a new ATS request.

Figure 9:
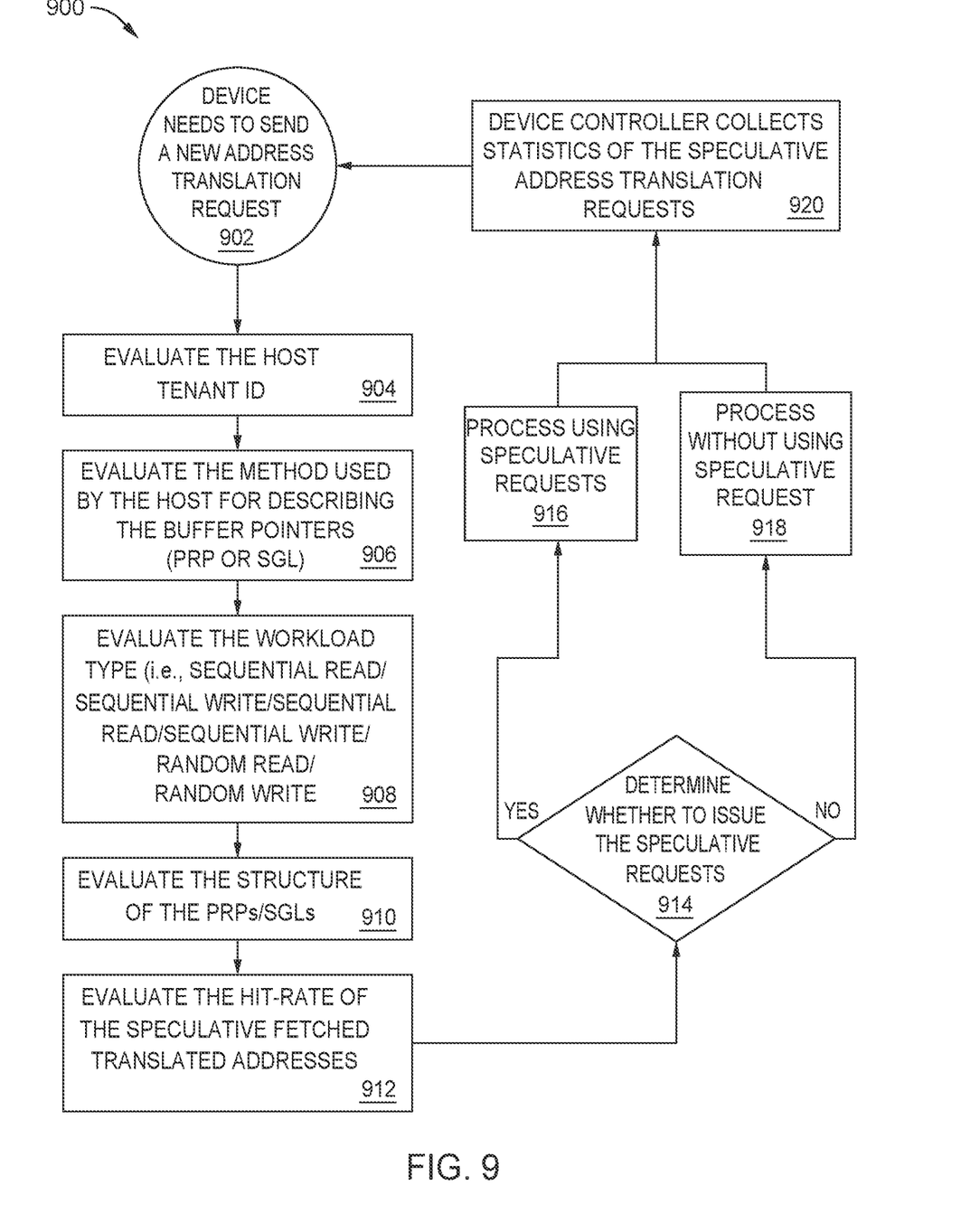
FIG. 9 is a flowchart illustrating a statistic collection and evaluation process of an address translation process, according to another embodiment.

FIG. 9 is a flowchart illustrating a statistic collection and evaluation process 900 of an address translation process, according to certain embodiment. The statistic collection and evaluation process 900 collects statistics to determine the benefit of using speculative fetching, the device controller then determines whether to issue speculative requests and in which attributes. The evaluation process occurs after the device controller has collected a threshold amount of statistical data to evaluate whether issuing speculative requests would be beneficial. In some embodiments, prior to crossing the threshold amount of statistical data to evaluate whether speculative fetching would be beneficial the device controller may have default configurations regarding speculative fetching (i.e., speculative fetching may be disabled, enabled, or enabled with constraints). In another embodiment, the device controller may change to a configuration different from the default configuration during the statistic collection and evaluation process 900.

The statistic collection and evaluation process 900 starts at 902, when the device controller needs to send a new address translation to the host device. The device controller then evaluates several statistics to determine whether to issue a speculative request with the normal ATS request. As part of the determination to use speculative fetching, the device controller may evaluate the host tenant ID 904; the method used by the host for describing the buffer pointers (PRP or SGL) 906; the workload type of the host device 908; the structure of the buffer pointers (PRPs and SGLs) 910; and the hit-rate of the speculative fetched translated addresses 912. At 914, the device controller determines whether to issue speculative requests based on any number and combination of the collected statistics.

If the device controller determines that there is a benefit to issuing speculative requests, at 916, the device controller will process the normal request aggregated with speculative requests. If the device controller determines that there is no benefit to issuing speculative requests, at 918, the device controller will process the normal request without adding speculating requests. At 920, once the device controller finishes processing, the device controller collects and updates the statistics of the speculative ATS requests with the new data collected from the most recent request. After the device controller collects and updates the statistics of the speculative ATS requests, the device controller will wait until there is a need to send a new ATS request 902.

Reducing extra traffic on the PCIe bus by initiating speculative address translation requests and aggregating them with normal address translation request can lead to significantly improved data retrieval performance. This can be achieved by issuing speculative address translation requests based on history or structure of host buffer pointers previously issued by each tenant. If the device controller determines that there is a high-hit rate probability, the controller will coalesce the speculative requests with the normal address translation request. The coalescing may be accomplished by dynamically changing the length field in the address translation request. The controller may also collect statistics of the speculative address translation requests per tenant. If the controller determines that the performance gain for a specific tenant's workload becomes minimal, the speculative request feature is disabled.

In one embodiment, a data storage device comprises: a memory device; and a controller coupled to the memory device, wherein the controller is configured to: determine a need to send an address translation request packet; send a speculative address translation request packet to a host device, wherein the speculative address translation request packet comprises at least one of: one or more speculative requests; and one or more non-speculative requests; receive the one or more translated speculative addresses from host device; and cache the one or more translated speculative addresses, wherein the data storage device is configured to be a part of a multi-tenancy system. The controller is further configured to send the speculative address translation request packet based on a history of host buffer pointers. The history of host buffer pointers are previously issued by at least one tenant of a plurality of tenants. The controller is further configured to send the speculative address translation request packet based on a structure of host buffer pointers. The structure of host buffer pointers are previously issued by at least one tenant of a plurality of tenants. The controller is further configured to: collect a statistic of an address translation request packet for at least one tenant; evaluate the collected statistic of the address translation request packet; and determine whether to send the speculative address translation request packet. The controller is further configured to: determine a need to expand the address translation request packet to cover additional untranslated contiguous addresses; evaluate a benefit of speculative fetching for address translation; add one or more speculative requests to the address translation request packet; and determine a value of a length field.

In another embodiment, a data storage device comprises: a memory device; and a controller coupled to the memory device, wherein the controller is configured to: collect at least one statistic of an address translation request packet; evaluate the collected statistic of the address translation request packet; and determine whether to issue a speculative address translation request. A statistic of the address translation request packet is a host tenant ID. A statistic of the address translation request packet is the method used by the host for describing the buffer pointers (physical region page (PRP) or scatter gather list (SGL). A statistic of the address translation request packet is a workload of a tenant. The workload of a tenant is evaluated based on: sequential read; sequential write; random read; or random write. A statistic of the address translation request packet is a structure of a host buffer pointer. A statistic of the address translation request packet is a hit-rate of a speculative fetched translated address. The controller is further configured to coalesce a speculative translation request with a non-speculative translation request. The controller is further configured to process additional translation requests without using speculative request when the hit-rate is below a predetermined threshold.

In another embodiment, a data storage device comprises: means to store data; and a controller coupled to the means to store data, wherein the controller is configured to: determine a need to send an address translation request packet; determine a need to expand the address translation request packet to cover additional untranslated contiguous addresses; evaluate a benefit of speculative fetching for address translation; add one or more speculative requests to the address translation request packet; determine a value of a length field; and cache the one or more speculative translated addresses. The controller is further configured to keep track of the one or more cached speculative translated addresses. The controller is further configured to collect and update at least one statistic of the address translation request. The value of the length field may change dynamically per address translation request.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      determine a need to send an address translation request packet, wherein the determination is based on:
         a history of host buffer pointers;
         a method used by a host for describing host buffer pointers, wherein the method comprises a physical region page (PRP) or a scatter gather list (SGL); and
         a structure of the PRP method or the SGL method;
      send a speculative address translation request packet to a host device based on the determination, wherein the speculative address translation request packet comprises at least one of:
         one or more speculative requests; and
         one or more non-speculative requests;
      receive the one or more translated speculative addresses from host device; and
      cache the one or more translated speculative addresses, wherein the data storage device is configured to be a part of a multi-tenancy system.

2. The data storage device of claim 1, wherein the history of host buffer pointers are previously issued by at least one tenant of a plurality of tenants.

3. The data storage device of claim 1, wherein the structure of host buffer pointers are previously issued by at least one tenant of a plurality of tenants.

4. The data storage device of claim 1, wherein the controller is further configured to:
   collect a statistic of an address translation request packet for at least one tenant;
   evaluate the collected statistic of the address translation request packet; and
   determine whether to send the speculative address translation request packet.

5. The data storage device of claim 1, wherein the controller is further configured to:
   determine a need to expand the address translation request packet to cover additional untranslated contiguous addresses;
   evaluate a benefit of speculative fetching for address translation;
   add one or more speculative requests to the address translation request packet; and
   determine a value of a length field.

6. The data storage device of claim 1, wherein the structure of the PRP method or the SGL method is an ascending structure.

7. The data storage device of claim 1, wherein the structure of the PRP method or the SGL method is an descending structure.

8. A data storage device, comprising:
   a memory device; and
   a controller coupled to the memory device, wherein the controller is configured to:
      collect at least one statistic of an address translation request packet, wherein the at least one statistic comprises:
         a history of host buffer pointers;
         a method used by a host for describing host buffer pointers, the method comprising a physical region page (PRP) or a scatter gather list (SGL); and
         a structure of the PRP method or the SGL method;
      evaluate the collected statistic of the address translation request packet; and
      determine whether to issue a speculative address translation request based on the evaluating.

9. A data storage device of claim 8, wherein a statistic of the address translation request packet is a host tenant ID.

10. A data storage device of claim 8, wherein a statistic of the address translation request packet is a workload of a tenant.

11. A data storage device of claim 10, wherein the workload of a tenant is evaluated based on:
   sequential read;
   sequential write;
   random read; or
   random write.

12. A data storage device of claim 8, wherein a statistic of the address translation request packet is a structure of a host buffer pointer.

13. A data storage device of claim 8, wherein a statistic of the address translation request packet is a hit-rate of a speculative fetched translated address.

14. A data storage device of claim 13, wherein the controller is further configured to coalesce a speculative translation request with a non-speculative translation request.

15. A data storage device of claim 14, wherein the controller is further configured to process additional translation requests without using speculative request when the hit-rate is below a predetermined threshold.

16. A data storage device, comprising:
   means to store data; and
   a controller coupled to the means to store data, wherein the controller is configured to:
      determine a need to send an address translation request packet;
      determine a need to expand the address translation request packet to cover additional untranslated contiguous addresses, wherein the determination of the need to expand is based on:
         a history of host buffer pointers;
         a method used by a host for describing host buffer pointers, the method comprising a physical region page (PRP) or a scatter gather list (SGL); and
         a structure of the PRP method or the SGL method;
      evaluate a benefit of speculative fetching for address translation;
      determine whether to add one or more speculative requests to the address translation packet based on the evaluating;
      add one or more speculative requests to the address translation request packet;
      determine a value of a length field; and
      cache one or more speculative translated addresses.

17. A data storage device of claim 16, wherein the controller is further configured to keep track of the one or more cached speculative translated addresses.

18. A data storage device of claim 16, wherein the controller is further configured to collect and update at least one statistic of the address translation request packet.

19. A data storage device of claim 16, wherein the value of the length field may change dynamically per address translation request.

* * * * *